United States Patent
Agama et al.

(10) Patent No.: US 6,694,944 B2
(45) Date of Patent: Feb. 24, 2004

(54) RAPID COMPRESSION PRECHAMBER FOR INTERNAL COMBUSTION ENGINE

(75) Inventors: Jorge R. Agama, Peoria, IL (US); Joel D. Hiltner, Powell, OH (US)

(73) Assignee: Caterpillar Inc., Peoria, IL (US)

( * ) Notice: Subject to any disclaimer, the term of this patent is extended or adjusted under 35 U.S.C. 154(b) by 26 days.

(21) Appl. No.: 10/027,131

(22) Filed: Dec. 20, 2001

(65) Prior Publication Data

US 2003/0116121 A1 Jun. 26, 2003

(51) Int. Cl.$^7$ ................................................ F02B 19/02
(52) U.S. Cl. ........................................ 123/292; 123/259
(58) Field of Search ................................ 123/259, 269, 123/279, 285, 286, 48 A, 657

(56) References Cited

U.S. PATENT DOCUMENTS

| | | | |
|---|---|---|---|
| 2,093,634 A | 9/1937 | Cordes | |
| 2,305,772 A | 12/1942 | Haage | |
| 2,920,444 A | 1/1960 | Jorgensen | |
| 2,970,581 A | * 2/1961 | Georges | 123/48 A |
| 3,577,726 A | 5/1971 | Wagner | |
| 3,941,101 A | 3/1976 | Kostylev et al. | |
| 3,970,056 A | * 7/1976 | Morris | 123/48 D |
| 4,096,844 A | * 6/1978 | Mackaness | 123/193.6 |
| 4,215,657 A | * 8/1980 | Burgio | 123/269 |
| 4,246,873 A | * 1/1981 | Lih-Liaw | 123/48 AA |
| 4,250,852 A | 2/1981 | Abulkasim ogly Kerimov et al. | |
| 4,271,810 A | 6/1981 | Lancaster | |
| 4,905,634 A | 3/1990 | Veldman | |
| 5,050,550 A | 9/1991 | Gao | |
| 5,109,817 A | 5/1992 | Cherry | |
| 5,243,940 A | 9/1993 | Göpel | |
| 5,431,140 A | 7/1995 | Faulkner | |
| 5,482,445 A | 1/1996 | Achten et al. | |
| 5,540,193 A | 7/1996 | Achten et al. | |
| 5,738,076 A | 4/1998 | Kim | |
| 6,260,520 B1 | * 7/2001 | Van Reatherford | 123/48 AA |
| 6,427,643 B1 | * 8/2002 | Dixon | 123/48 A |

* cited by examiner

*Primary Examiner*—Mahmoud Gimie
(74) *Attorney, Agent, or Firm*—Marshall, Gerstein & Borun LLP; Keith P. Roberson

(57) ABSTRACT

A rapid compression device for use in initiating combustion within an internal combustion engine is disclosed. The rapid compression device employs a prechamber adapted to be in fluid communication with a main combustion chamber of the internal combustion engine. A piston is provided within a cylinder of the prechamber and compresses natural gas therein to a degree sufficient to auto-ignite the gas when mixed with air. The auto-ignition of the gas and air mixture results in combustion gases which are communicated to the main combustion chamber for ignition of the air and gas mixture provided therein as well.

20 Claims, 3 Drawing Sheets

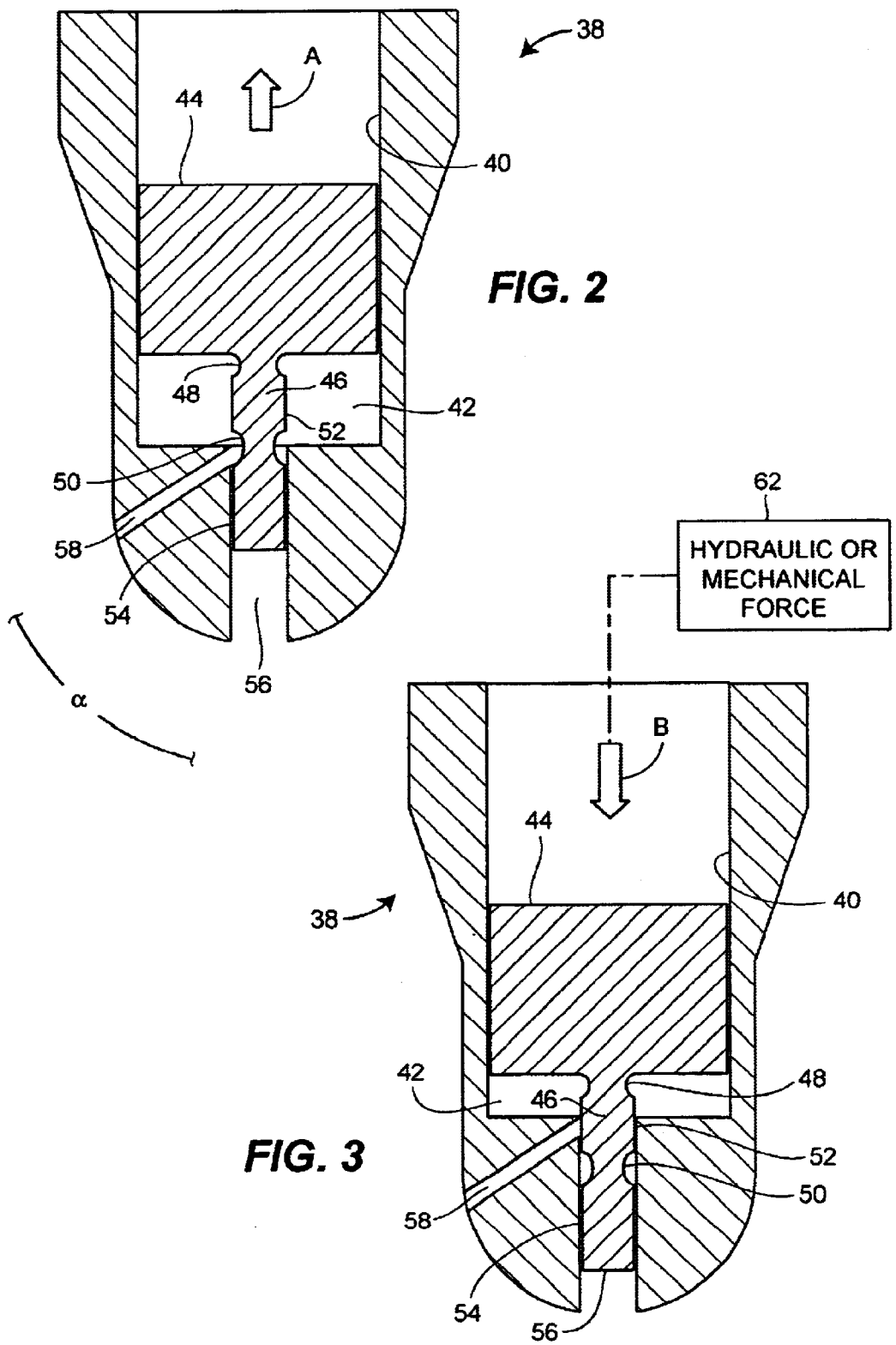

RAPID COMPRESSION PRECHAMBER FOR INTERNAL COMBUSTION ENGINE

TECHNICAL FIELD

This disclosure relates generally to internal combustion engines and, more particularly, to ignition devices for internal combustion engines.

BACKGROUND

Internal combustion engines are well known. Those employing gasoline as fuel typically employ a number of cylinders which compress a gasoline and air mixture such that upon firing of a spark plug associated with each cylinder, the compressed mixture ignites. The expanding combustion gases resulting therefrom move a piston within the cylinder. Upon reaching an end of its travel in one direction within the cylinder, the piston reverses direction to compress another volume of the gasoline and air mixture. The resulting mechanical energy can and has been harnessed for use in myriad applications, foremost among which is the propulsion of vehicles.

Another type of internal combustion engine utilizes the heat generated by highly compressed air to ignite a spray of fuel released into a cylinder during a compression stroke. In such an engine, known as a compression ignition engine, the air is compressed to such a level as to achieve auto-ignition of the fuel upon contact between the air and fuel. The chemical properties of diesel fuel are particularly well suited to such auto-ignition.

The concept of auto-ignition is not limited to diesel engines, however, and has been employed in other types of internal combustion engines as well. For example, it is known to provide a self-igniting reciprocating internal combustion engine wherein fuel is compressed in a main combustion chamber by a reciprocating piston. In order to facilitate starting, each main combustion chamber is associated with a prechamber, particularly useful in starting cold temperature engines. Fuel is injected not only into the main combustion chamber, but the combustion chamber of the prechamber as well, such that upon compression by the piston, a fuel and air mixture is compressed in both chambers. A glow plug or other type of heater is disposed within the prechamber to elevate the temperature therein sufficiently to ignite the compressed mixture. The combustion gases resulting from the ignition are then communicated to the main combustion chamber as well.

Other types of internal combustion engines utilize natural gas as the fuel source. For example, it is also known to provide a compressed natural gas engine wherein a piston reciprocates within a cylinder. A spark plug is positioned within a cylinder head associated with each cylinder and is fired on a timing circuit such that upon the piston reaching the end of its compression stroke, the spark plug is fired to thereby ignite the compressed mixture.

In still further types of internal combustion engines, prechambers are employed in conjunction with natural gas engines. Given the extremely high temperatures required for auto-ignition with natural gas and air mixtures, glow plugs or other heat sources such as those employed in typical diesel engines, are not effective. Rather, a prechamber is associated with each cylinder of the natural gas engine and is provided with a spark plug to initiate combustion within the prechamber which can then be communicated to the main combustion chamber. Such a spark plug-ignited, natural gas engine prechamber is provided in, for example, the 3600 series natural gas engines manufactured by Caterpillar, Inc., the assignee of the present application.

While such engines have proven to be effective, the utilization of spark plugs and fuel enrichment circuits associated with current natural gas engines add cost and complexity to the overall system. In addition, given the usage of spark plugs, the resulting combustion gases include undesirably high levels of pollutants such as nitrous oxide (NOx).

The present disclosure is directed to overcoming one or more of the problems or disadvantages associated with the prior art.

SUMMARY

In accordance with one aspect of the disclosure a combustion prechamber assembly is provided which includes a cylinder defining a prechamber, and a piston mounted within the cylinder. The piston is adapted to reciprocate in first and second directions within the cylinder, with movement of the piston in the first direction drawing an air and fuel mixture into the prechamber and movement of the piston in a second direction compressing the air and fuel mixture sufficiently to auto-ignite.

In accordance with another aspect of the disclosure, a method of igniting an engine having a prechamber in fluid communication with a main combustion chamber is provided which includes the steps of drawing a mixture of fuel and air into the prechamber, compressing the mixture of fuel and air sufficiently to cause ignition, and communicating combustion gases resulting from the ignition from the prechamber to the main chamber.

In accordance with another aspect of the disclosure, an engine is provided which includes a main combustion chamber, a prechamber, and a channel. The prechamber is adapted to be in fluid communication with the main combustion chamber and includes a piston adapted to compress a mixture of air and fuel to a point of auto-ignition. The channel connects the prechamber to the main combustion chamber and is adapted to communicate combustion gases from the prechamber to the main combustion chamber.

These and other aspects and features of the disclosure will become more apparent from the following detailed description when taken in conjunction with the accompanying drawings.

BRIEF DESCRIPTION OF THE DRAWINGS

FIG. 2 is an enlarged sectional view of a prechamber assembly of the engine, and depicting the piston thereof in an intake stroke;

FIG. 3 is an enlarged sectional view of the prechamber assembly, and depicted in a compression stroke.

Figure 1:
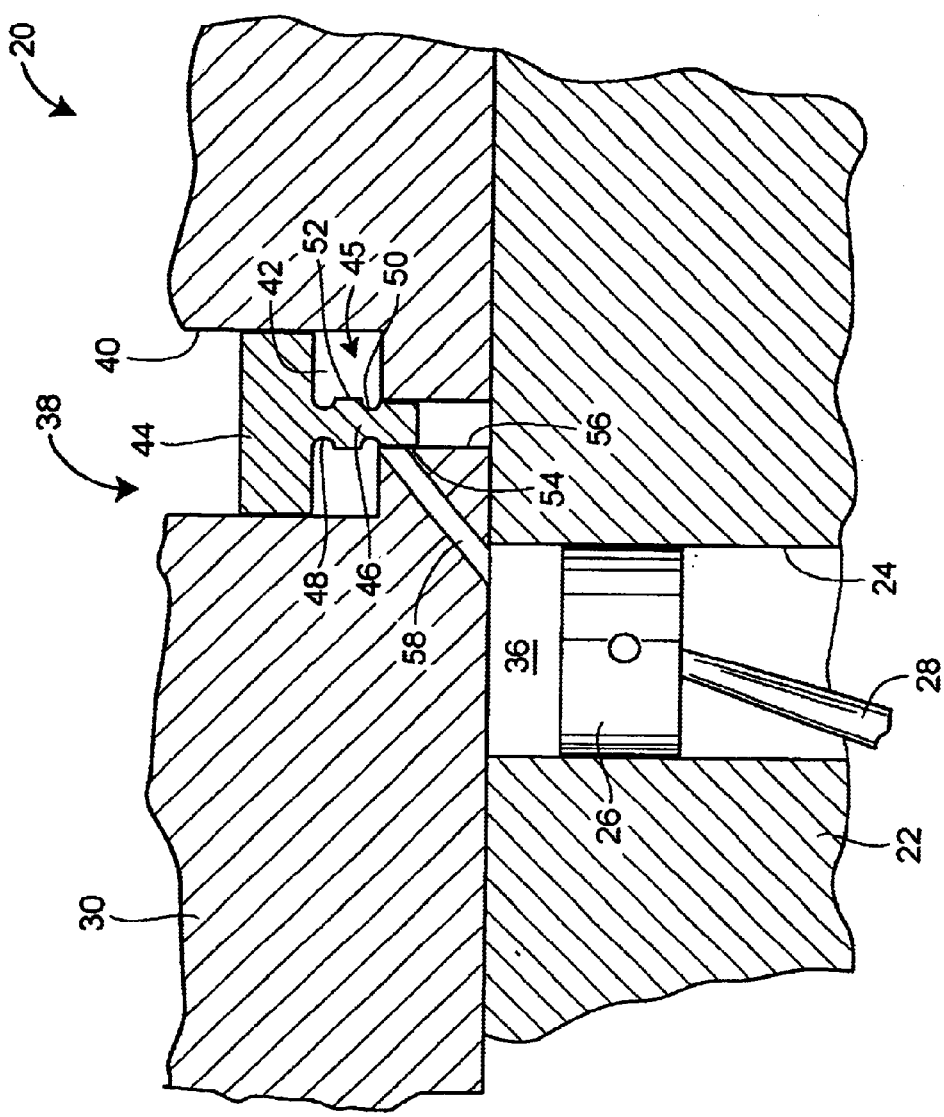
FIG. 1 is a sectional view of an engine constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

DETAILED DESCRIPTION

Referring now to the drawings, and with specific reference to FIG. 1, an internal combustion engine constructed in accordance with the teachings of the disclosure is generally depicted by reference numeral 20. As shown therein, the engine 20 includes a cylinder block 22 with a cylinder 24 therein. While FIG. 1 depicts only one cylinder 24, it is to be understood that the engine 20 would typically include a number of additional cylinders 24. A piston 26 is positioned within the cylinder 24 and is connected by a rod 28 to a crank shaft (not shown), or other mechanism for capitalizing upon the motion of the piston 26.

A cylinder head 30 is provided atop the cylinder block 22 and encloses the cylinders 24. Fuel injectors and valves may be provided in the cylinder head 30 and be adapted to be in fluid communication with the cylinder 24 to release a fuel and air mixture into the cylinder 24 for combustion therein. The cylinder 24 defines a main combustion chamber 36 for the engine 20.

A rapid compression device preferably provided in the form of a prechamber assembly 38 is positioned within the cylinder head 30. As shown best in FIGS. 2–4, the prechamber assembly 38 includes a prechamber cylinder 40 defining a prechamber 42. A piston 44 resides within the prechamber 42 and is adapted for reciprocating motion therein as will be described in further detail below. While any number of volumes may be employed in the prechamber 42, a prechamber 42 having three to five percent of the volume of the engine combustion chamber 36, and a compression ratio of 5:1 to 7:1 is sufficient.

The prechamber assembly 38 further includes a valve 45 to enable and disable fluid communication into and out of the prechamber 42. The valve 45 may be provided in the form of a stem 46 extending from the piston 44. In the depicted embodiment, the stem 46 is centrally located on the piston 44 and extends orthogonally therefrom. The stem 46 includes a first recess 48, and a second recess 50 spaced therefrom by a first full section 52. The stem 48 also includes a second full section 54.

The stem 46 is received in a guiding bore 56 provided within the prechamber cylinder 40. Extending from the guiding bore 56 is a channel 58. In the depicted embodiment, the guiding bore 56, and channel 58, are adapted to be in fluid communication with the prechamber 42. The channel 58 is also adapted to be in fluid communication with the main combustion chamber 36.

The piston 44 may be driven within the cylinder 40 by a number of different types of actuators 62, including hydraulic and pneumatic actuators (wherein fluid pressure within the prechamber cylinder 40 causes the prechamber piston 44 to move) or mechanical systems including those employing cams, push rods, or springs. The actuator 62 moves the piston both into and out of the prechamber cylinder 40. The prechamber 42 may also be provided with a lubrication system (not shown) to facilitate operation. It may prove advantageous to employ a hydraulic or pneumatic actuator 62 where engine speed and load, and thus piston speed are to be variable, and to use a mechanical system when operating under more constant speeds and loads.

While the rapid compression prechamber assembly 38 is depicted as including a recessed stem 46 serving as a valve, it is to be understood that the prechamber assembly 38 could be alternatively constructed, including, but not limited to, an embodiment wherein separate cam, spring or fluid, actuated values control communication to and from the prechamber 42.

INDUSTRIAL APPLICABILITY

In operation, the internal combustion engine 20 can be used to power any number of machines, vehicles, or operations wherein mechanical energy resulting from the motion of the piston 26 can be utilized. For example, the engine 20 can be used for propelling vehicles or providing mechanical motion for various machines. In addition, the motion in the piston 26 can be utilized in conjunction with a generator (not shown) for converting the resulting mechanical energy to electrical energy utilizable in various operations including the provision of lighting and power. Moreover, the engine 20 can be started, in normal conditions, without the use of spark plugs or glow plugs or expensive ignition and prechamber ignitions systems. Furthermore, by employing homogeneous charge compression ignition (HCCI), minimal levels of nitrous oxide (NO2) are produced due to the very lean conditions under which HCCI is possible.

Figure 4:
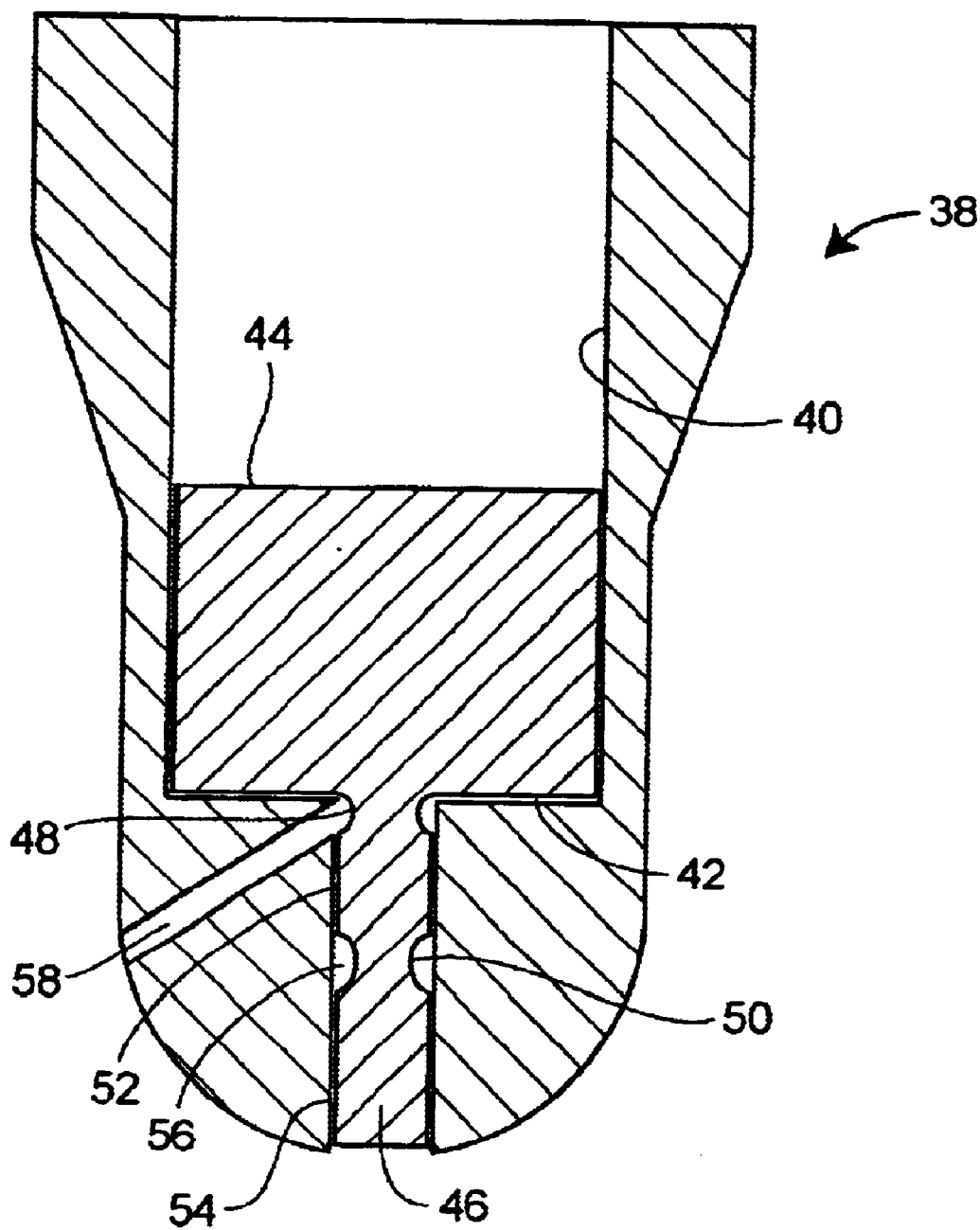
FIG. 4 is an enlarged sectional view of a prechamber assembly, and depicted in an exhaust stroke.

Referring now to FIGS. 2–4, the prechamber assembly 38 is depicted in three different stages of operation. In FIG. 2, the prechamber assembly 38 is shown with the piston 44 moving upward as indicated by arrow A and approaching the end of its upward path. Motion in the direction of arrow A is referred to as an intake stroke. It can be seen that upon reaching the position shown in FIG. 2, the second reduced diameter section 50 is in alignment with, or is proximate to, the channel 58. Since the channel 58 is in fluid communication with the main combustion chamber 36, when the piston 44 is in the position of FIG. 2, the prechamber 42 is in fluid communication with the main combustion chamber 36. The movement of the piston 44 within the prechamber 42 creates a vacuum within the prechamber 42 drawing fuel and air from the main combustion chamber 36 into the prechamber 42.

With specific reference to FIG. 3, the piston 44 is depicted moving downwardly in the direction of arrow B within the prechamber 42 with the first full section 52 of the stem 46 proximate the channel 58. The force required for doing so is provided by the actuator 62. In so doing, the channel 58 is fluidically separated from the prechamber 42. When the prechamber 42 is not in fluid communication with the main combustion chamber 36, as is the case during the compression stroke depicted in FIG. 3, the continued downward motion of the piston 44 causes the fuel and air mixture within the prechamber 42 to compress within the prechamber 42. Given the small volume of gas and air within the prechamber 42 and the force with which the piston 44 compresses the gas and air mixture, the mixture therein reaches a sufficiently high temperature so as to cause the air and gas mixture to auto-ignite. For example, we have determined that if a compression ratio of 17 to 1 is utilized in a cylinder having an initial temperature of 100° C., the completion of the compression stroke will result in the gas and air mixture reaching a temperature in access of 1,000° C., sufficient for self-ignition of the air and gas mixture. If, however, the cylinder wall temperature is less, as with cold temperature starts, a glow plug within the prechamber 42, or spark plug in the main chamber 36, may be necessary to start the engine.

Referring now to FIG. 4, the prechamber assembly 38 is depicted in an exhaust stroke wherein the piston 44 has reached the end of its downward travel. In so doing, the first recess 48 is proximate the channel 58 which, in turn, again places the prechamber 42 into fluid communication with the main combustion chamber 36. Accordingly, the combustion gases resulting from the auto-ignition within the prechamber 42 are communicated via the channel 58 to the main combustion chamber 36 for ignition of the compressed air and gas provided therein as well. Combustion of the air and gas provided within the main combustion chamber 36, in turn, causes the expanding combustion gases to force the piston 26 away from the cylinder head 30, with the resulting motion in the rod 28 being utilizable by undepicted downstream machinery.

The piston 44, upon completion of the exhaust stroke, then reciprocates in an upward direction to again conduct the exhaust stroke of FIG. 2 for continued operation of the prechamber assembly 38. The motion of piston 44 may be accomplished by any of the foregoing actuators 62, or any other suitable mechanism such as a return spring. A sealing ring (not shown) or the like may be provided within the guiding bore 56 to prevent combustion gases and particulars from accumulating therein.

Other aspects and features of the disclosure can be obtained from a study of the drawings, the disclosure, and the appended claims.

What is claimed is:

1. An engine, comprising:
   a main combustion chamber;
   a prechamber adapted to be in fluid communication with the main combustion chamber, the prechamber including a piston adapted to compress a mixture of air and fuel to a point of ignition;
   a channel connecting the prechamber to the main combustion chamber and adapted to communicate combustion gases from the prechamber to the main combustion chamber; and
   a valve adapted to selectively open and close the channel.

2. The engine of claim 1, wherein the engine includes a cylinder block, the cylinder block including the channel adapted to be in fluid communication with the main combustion chamber and prechamber.

3. The engine of claim 2, wherein the valve is in the form of a stem extending from the piston, and wherein the cylinder block includes a bore adapted to reciprocatingly receive the stem.

4. The engine of claim 3, wherein the stem includes a large diameter section having a diameter substantially the same as a diameter of the bore and a recessed diameter section having a diameter less than the diameter of the bore, and wherein the channel is in fluid communication with the prechamber and main combustion chamber when the recessed diameter section is adjacent the passage, the passage being fluidically separated from the prechamber when the full diameter section is adjacent the channel.

5. The engine of claim 3, wherein the stem includes first and second full diameter sections and first and second recessed diameter sections, the first recessed diameter section being proximate the piston, the second recessed diameter section being spaced from the piston and first recessed diameter section by the first full diameter section, the prechamber being in fluid communication with the main combustion chamber when one of the first and second areas of recessed diameter are proximate the channel.

6. The engine of claim 1, wherein the piston is driven by one of a mechanical and hydraulic actuator.

7. A combustion prechamber assembly, comprising:
   a cylinder defining a prechamber;
   a piston mounted within the cylinder and adapted to reciprocate in first and second directions within the cylinder, movement of the piston in the first direction drawing an air and fuel mixture into the prechamber, movement of the piston in the second direction compressing the air and fuel mixture sufficiently to auto-ignite; and
   a valved channel adapted to place the prechamber in fluid communication with a main combustion chamber of an engine.

8. The combustion prechamber assembly of claim 7, wherein the engine is a natural gas engine.

9. The combustion prechamber assembly of claim 7, wherein the valve is a stem extending from the piston, and wherein the combustion prechamber assembly includes a bore adapted to reciprocatingly receive the stem.

10. The combustion prechamber assembly of claim 9, wherein the stem includes a full section having a diameter substantially equal to a diameter of the bore, and a recessed section having a diameter less than the diameter of the bore, and wherein the channel is in fluid communication with the bore, the channel being in fluid communication with the prechamber when the recessed section is adjacent the channel, the channel being fluidically separated from the prechamber when the full section is adjacent the channel.

11. The combustion prechamber assembly of claim 10, wherein the stem includes first and second full sections and first and second recessed sections, the first recessed section being proximate the piston, the second recessed section being spaced from the piston and first recessed section by the first full section.

12. The combustion prechamber assembly of claim 7, wherein the piston is driven by a hydraulic actuator.

13. The combustion prechamber assembly of claim 7, wherein the piston is driven by a mechanical actuator.

14. A method of igniting an engine having a prechamber in fluid communication with a main combustion chamber, comprising the steps of:
   drawing a mixture of gas and air into the prechamber;
   compressing the mixture of gas and air sufficiently to cause ignition; and
   communicating the combustion gases resulting from the ignition from the prechamber to the main chamber by way of a valve.

15. The method of igniting an engine of claim 14, wherein the prechamber includes a movable piston within a cylinder and wherein the drawing step is performed by moving the piston in a first direction within the cylinder.

16. The method of igniting an engine of claim 15, wherein the compressing step is performed by moving the piston in a second direction.

17. The method of igniting an engine of claim 16, wherein the communicating step is performed by moving the piston in the second direction.

18. The method of igniting an engine of claim 14, wherein the piston is moved hydraulically.

19. The method of igniting an engine of claim 14, wherein the piston is moved mechanically.

20. The method of igniting an engine of claim 17, wherein the piston includes a stem having first and second spaced recesses and the cylinder is associated with a channel, the stem reciprocating within the channel when the piston is moved in the first and second directions, the mixture of gas and air traveling through the channel during the drawing step, and ignited gases being expelled through the channel during the communicating step, the first spaced recess being aligned with the channel during the drawing step, the second spaced recess being aligned with the channel during the communicating step, both spaced recesses being not aligned with the channel during the compressing step.

* * * * *